Nov. 18, 1930.  S. G. BROWN  1,781,746
GYROSCOPIC INDICATING INSTRUMENT
Filed Nov. 21, 1929
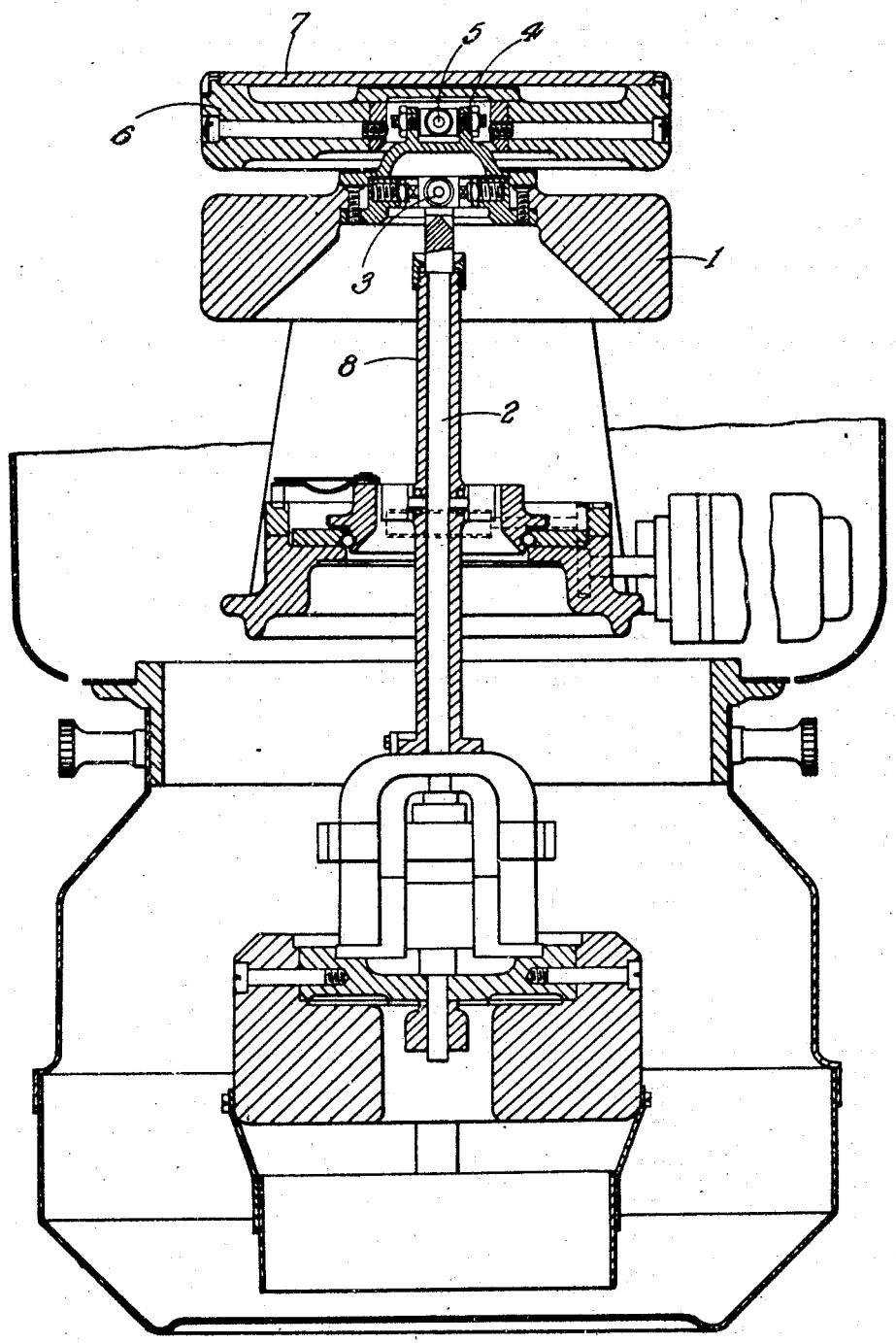

Patented Nov. 18, 1930

1,781,746

UNITED STATES PATENT OFFICE

SIDNEY GEORGE BROWN, OF NORTH ACTON, ENGLAND

GYROSCOPIC INDICATING INSTRUMENT

Application filed November 21, 1929, Serial No. 408,871, and in Great Britain November 29, 1928.

This invention relates to gyroscopic indicating instruments such as artificial horizons or zenith indicators. Such instruments form the subject matter of English Patent No. 261,117 and of pending United States patent application No. 187,608 comprising a gyro wheel which is rotated about a vertical axis from a vertical spindle, being connected to this spindle by Hooke's joint or equivalent coupling. In such an arrangement, however, it has been found that there is a tendency for angular deviation of the axis of the gyro wheel to be produced due to motion such as rolling or pitching of the ship or other moving object on which the instrument is installed. By mounting the driving spindle in a pendulous frame carried by ball bearings and minimizing any friction in the Hooke's joint or like coupling, such, for example, as by fitting ball bearings to its pivots, it is possible greatly to reduce the above mentioned deviation of the gyro axis, but even this reduced deviation has been found sufficient to prevent the successful use of the device as an artificial horizon or zenith indicator, and it is the main object of the present invention to overcome this disadvantage.

According to the invention a number of gyro wheels are connected together by universal couplings in such a manner that rotation is transmitted from one to the other throughout the series, the first of the series being driven through a universal coupling from a spindle, preferably mounted in a pendulous frame, and the last of the series carrying the mirror which constitutes the artificial horizon, or other indicating device the position of which with respect to the earth's radius at any given point it is desired to maintain. By this means there is a progressive diminution of the deviation due to motion of the ship or the like and transmitted successively to the gyro wheels, and it is found possible to make the deviation of the last wheel of the series so small as not sensibly to affect the horizontality of the mirror constituting the artificial horizon or the setting of the zenith indicator or the like with respect to the earth's radius.

In order that the invention may be clearly understood and readily carried into effect it will now be described more fully with reference to the accompanying drawing, which illustrates by way of example and in longitudinal section an artificial horizon constructed in accordance with the invention.

In the apparatus illustrated the first gyro wheel 1 of the series is driven, as in the instruments described in the specifications above referred to, from a vertical spindle 2 through a Hooke's joint or equivalent coupling 3. Mounted on this first gyro wheel 1 is the fork 4 of a second Hooke's joint 5, the complementary fork of which is attached to a second gyro wheel 6. The masses of these wheels are preferably so disposed that the centre of gravity of the combination of the wheels and their intermediate coupling 5 substantially coincides with the Cardan point of the Hooke's joint 3 whereby the first wheel 1 is driven, while the centre of gravity of the second wheel 6 and its attachments substantially coincides with the Cardan point of the coupling 5 by which it is driven. The mirror 7 or other indicating device is carried by the second gyro wheel 6; alternatively this wheel may serve to drive a third gyro wheel by means of a coupling similar to that existing between the first and second wheels. Thus any number of wheels may be employed, the mirror or other indicating device being mounted on the last of the series. In any case the masses of the wheels are preferably so disposed that, considering any number of them from and including the last, the centre of gravity of the combination substantially coincides with the Cardan point of the coupling through which the first wheel of the number considered is driven.

As indicated, the spindle 2 is preferably supported in a sleeve 8 forming part of a pendulous frame, which may, for example, be constructed in accordance with the specification of copending United States patent application No. 367,602.

It will be seen that, by an arrangement such as described, a very rapid diminution of the deviation successively transmitted to the gyro wheels may be effected. Thus, if the wheels be so designed, as is in fact found to be possible in practice, that in each case the angular deviation transmitted shall only amount to one-tenth of that of its driving member, it will be seen that, if, for example, there be three gyro wheels, the angular deviation of the first will amount to one-tenth of the rolling or other motion of the ship, while that of the second and third will respectively be only one-hundredth and one-thousandth of that motion. Hence, by sufficiently extending the series, it is possible to reduce the angular deviation transmitted to the last wheel of the series to an entirely negligible amount.

It will be realized that the actual indicating means will vary in accordance with the type of instrument to which the invention is applied; for instance, it may take the form of a mirror as in the example above described or of a vertical index finger and in the following claims the term "indicating device" has been used to cover all such different indicating means and is to be so understood.

What I claim and desire to secure by Letters Patent of the United States is:—

1. A gyroscopic indicating instrument comprising a series of gyro wheels, a universal coupling between and rotatably connecting each adjacent pair of said wheels, a driving spindle, a universal coupling rotatably connecting said driving spindle with the first of said series of gyro wheels and an indicating device fitted to the last of said gyro wheels.

2. A gyroscopic indicating instrument as in claim 1, in which the masses of said wheels are so disposed that, considering any number of said wheels from and including the last wheel, the centre of gravity of the combination so considered coincides with the Cardan point of the said coupling through which the first wheel of the said number of wheels considered is driven.

SIDNEY GEORGE BROWN.